United States Patent Office 3,044,848
Patented July 17, 1962

3,044,848
METHOD OF URANIUM RECOVERY
Augustin Driessen and Henri de Saint-Chamant, Paris, France, assignors, by mesne assignments, to Centre d'Etudes et de Recherches des Phosphates Mineraux Cerphos, Paris, France, a corporation of France
No Drawing. Filed July 8, 1958, Ser. No. 747,128
Claims priority, application France July 12, 1957
2 Claims. (Cl. 23—14.5)

This invention relates to uranium recovery processes, and more particularly to methods of recovering uranium from slag by-product of elemental phosphorus furnaces.

Natural phosphates usually contain extremely low concentrations of uranium so that the direct extraction of uranium from phosphate ores is rarely attempted. Instead, products derived by treatment of phosphate ores, such as phosphoric acid and superphosphate, are frequently retreated for recovering the uranium therein.

It has, moreover, already been suggested that the reduction of phosphate ores with carbon in the presence of silica, in accordance with the thermal process of phosphorous manufacture in a furnace, might be liable to provide a by-product from which uranium may be recovered with some advantage. This by-product is, in effect, the silicate-containing slag which under the usual conditions of operation of phosphorous furnaces, retains a substantial proportion of the uranium initially contained in the phosphate ore, such that the uranium content in the slag is appreciably higher than in the initial phosphate ore.

However, the various methods of treating slag which were heretofore attempted for the purpose just specified, were found to be too inefficient for economic feasibility.

Thus, one type of treatment that has been tried, involving dry processing of the slag, comprises extraction of the uranium by means of molten salts and molten metals ($CaCl_2$, bismuth, iron, lead, tin). However, the high temperatures required for such processes were not offset by the very low uranium yields obtainable.

Various wet processes have also been proposed.

In a first class, the slag is finely ground (200 mesh Tyler screen) and extracted with soda carbonate solutions of high concentration, on the order of 10%, and at or near boiling point, for periods of time ranging from some hours to several days. The yields obtained in this way rarely exceed 10 to 15% apparently because of the low porosity of the slag and the homogeneous distribution of the uranium therein.

In another class of conventional methods, the slag, which being a lime silicate is readily attacked by acids, is treated with an acid to place the uranium in solution together with the iron and aluminium. This class of methods however present major drawbacks. First, an amount of acid has to be used which is substantially higher than that corresponding to the calcium salt obtained, thus prohibitively increasing the cost price. Moreover, the small amounts of uranium in solution have to be separated from the large amounts of soluble calcium salt present, and this is also a tedious and expensive step.

It is an object of this invention to recover uranium from slag by-product of elemental phosphorus furnaces more economically than was heretofore believed possible.

In the method of the invention, the slag resulting from thermal reduction of phosphate ores with carbon in the presence of silica is subjected to treatment with an acidic reagent so as to dissolve a substantial proportion of calcareous constituents in said slag while allowing substantially all of the uranium present in the slag to remain in the solid residual product of said acid reaction, and extracting the uranium from said solid residual product. The overall economic efficiency of the process is very high.

Further, the retention of the uranium in the solid residue resulting from acid attack of the silicates, has additional advantages:

(a) A siliceous ore is obtained which has a higher uranium content than the original slag;

(b) In accordance wtih an aspect of this invention, the solid residue can be reused in a phosphorus furnace so as progressively to enrich the slag issuing from the furnace.

According to the invention, retention of the uranyl ion in the solid phase is obtained by providing a certain number of critical conditions in the reaction medium, including:

Increasing the insolubility of uranyl phosphate at a pH of about 3, this insolubility being increased by the presence of an excess of calcium ions.

Increasing the entrainment capacity of iron phosphates and aluminium phosphates with regard to the uranyl phosphate.

One type of slag which is particularly convenient for the purposes of the invention, is that having at least 1% $P_2O_5$ and a combined $Fe_2O_3+Al_2O_3$ concentration in the order of a few percent.

According to the present invention, the procedure for decomposition of the slag involves the following steps.

The slag is first very finely ground (e.g. 150 mesh Tyler screen), diluted in an amount of water approximately of the same order of magnitude, by weight, as the amount of slag treated, and the mixture is milled to provide a homogeneous pulp.

In order to prevent any momentary excess of acidity in the reaction medium, the acid is added to the slag pulp, rather than the reverse. The addition of slag pulp to acid would result in the formation of silica gels that would be difficult to filter off, and would partially dissolve the uranium. The pulp is energetically stirred especially during the acid addition step to prevent local acid build-up.

As an alternative procedure, the acid reagent may be added in a continuous manner to the slag pulp, provided it is added at a slow rate. It is found preferable however to subdivide the acid addition into a number of partial steps between which intervals of a few minutes intervene, during which the stirring is not discontinued. This improves the insolubiltiy of the silica and hence facilitates subsequent filtering of the silica.

The retention time in the reactor tanks, whether the process is continuous or discontinuous, should not be less than about one hour, since this is the time necessary for a complete attack and optimum insolubilization of the silica and low soluble uranium compounds.

Almost any strong acid may be used as the attacking agent, such as hydrochloric acid, nitric acid, perchloric acid, phosphoric acid (added in an amount sufficient to produce monocalcium phosphate). Sulphuric acid, however, should not be used, since it forms complex salts with the uranyl ion which would result in solubilisation of the uranium.

In the practice of the invention, an acid of 5–6 N concentration is preferably used. In the special case of nitric acid treatment the concentration used may therefore be about 30%.

As a broad rule, the maximum total quantity of acid used should not exceed that of the stoichiometrical amount corresponding to the calcium content in the slag, regardless of the aluminium and iron contents of the slag.

Where the slag is poor in $P_2O_5$ and rich in iron, it is found desirable to incorporate a small amount of phosphoric acid to the acidic reagent in order to insure precipitation of the iron and uranyl phosphates and minimize the amount of the ferric ions passing into solution, since the ferric coloration is detrimental for the commercial value of the calcium salt produced. The amount of phosphoric acid required to precipitate the iron and uranyl phosphates contained in the slag depends on the concentrations of these elements in the initial ore. Such quantity may generally lie within the range of from 5 to 15 liters phosphoric acid (80% $H_3PO_4$) per ton treated slag.

In above described conditions it becomes possible to obtain pH values of final pulps ranging from 2 to 3 and at this pH range the insoluble character of iron phosphate and uranyl phosphate can be put to good use.

The temperature throughout the reaction should be maintained in a range of from 70 to 80° C., this being an optimum temperature range for insolubility of the silica and of the less-soluble salts of uranium and iron.

On completion of the reaction the insoluble fraction is separated by filtration and counterflow washed with a suitable volume of washing water, a satisfactory amount being from 6 to 8 cubic meters water per ton slag treated.

Recycling techniques are applicable to the washing water, each volume of washing water, taking, at the next stage of manufacture, the place of the washing water which preceded it in the immediately preceding stage. Depending on the type of flowsheet used, the water from the first washing step may be combined with the concentrated liquor separated by filtration and the combined liquor providing the calcium salt mother solution. Alternatively, the water from the first washing step may be used in a subsequent production step, either as the water for diluting the acid, or for diluting the slag; however, such procedure will considerably slow down the rate of pulp filtration.

Generally, the above specified conditions will make it possible to solubilize about 90% of the calcium contained in the slag and to retain the major proportion of the uranium in the solid fraction.

Depending on the nature of the acid used, the calcium salt may for example be crystallized from the filtered mother solution in accordance with conventional methods, to obtain commercially valuable salts.

The recovery of the uranium retained in the solid phase may be effected by conventional techniques, as by sulphuric acid treatment or extraction with soda carbonate.

However, in accordance with the present invention, the residual silica may advantageously be reused as a charge in phosphorus furnaces, so as to obtain, by reduction of further amounts of phosphate, a silicate slag which will be richer in uranium and can then be retreated in accordance with the method of the invention.

This uranium enrichment of the slag is finally limited by the coefficient of distribution of the uranium between the slag and the ferrophosphorus which coefficient is strictly dependent on the reducing character of the charge and the furnace temperature.

The invention will now be illustrated by a few non-restrictive examples.

*Example I*

The slag used is a by-product of thermal treatment of a Khourigba phosphate, having the following analysis:

| | Percent |
|---|---|
| CaO | 49.2 |
| Siliceous matters | 37 |
| Fluorine | 3 |
| $Fe_2O_3$ | 0.75 |
| $Al_2O_3$ | 4.86 |
| $P_2O_5$ | 2.33 |
| $CO_2$ | 1.64 |
| S (sulphide) | 0.84 |
| S (sulphate) | 0.07 |
| Uranium | 0.03 |

The slag was ground so as to pass entirely through a 150 mesh Tyler screen. One kilogram of the slag was introduced in 1 liter water and intimately mixed.

The acidic reagent was a mixture containing 1.550 ml. of nitric acid containing 711 grams/liter $HNO_3$, and 1.450 ml. water, which corresponds to 1.102 grams pure $HNO_3$, so that there was a defect of 0.4% with respect to the stoichiometrical quantity.

Since the slag already contained 2.33% $P_2O_5$, no phosphoric acid was added to the acid reagent.

The acidic reagent as just described was added over a period of 15 minutes to the slag pulp with strong agitation all the time and at a temperature of 70° C. The pulp was then stirred 45 minutes while maintaining the same temperature.

The resulting pulp was then filtered, thereby obtaining 2.5 liters concentrated liquor from which there was derived, by crystallization and drying in air, a commercial calcium nitrate titering nitric N 13.5%; CaO 26.5%; $Al_2O_3$ 1.8%; $Fe_2O_3$ 0.2%; $SiO_2$ 0.2%.

The solid fraction retained in the filter was washed with 4 batches of hot water 1.5 liters each.

After drying there were obtained 510 grams of a siliceous residue having the following analysis:

Nitric N—0.1%.
CaO—8% (the dissolution yield in Ca, in terms of the CaO content in the silica, was therefore 91.7%).
U—0.047%.

The proportion of uranium thus retained was $$\frac{470 \times 510 \times 100}{300 \times 1000} = 79.9\%$$

*Example II*

The same slag stock was used as in Example I, and was ground to the same fineness, but hydrochloric acid was used as the reagent.

To 1 kg. slag intimately mixed with 1 liter water, there was added a mixture comprising: 1.400 ml. hydrochloric acid containing 449 g./l. HCl; and 1.600 ml. water, thereby introducing 628.6 grams of pure HCl into the reaction, or 1.9% less than the stoichiometrical amount.

In view of the $P_2O_5$ content present in the slag material, no phosphoric acid was added to the acid reagent. The acid reagent was added in twelve batches 250 ml. each, and each batch was added over a period of 2 minutes, there being 2 minute interruptions between additions of the successive batches. After the last addition the reaction was continued for 15 minutes further. The temperature was maintained at 70 to 74° C. throughout the process.

The pulp was filtered, thereby producting 2.7 liters concentrated liquor, which was subsequently treated by conventional methods to produce commercial calcium chloride.

The filter cake was washed with 6 liters hot water. After draining and drying 508 grams of residual silica were obtained, which were found to contain:

CaO—9.5% (whereby the solubilization yield of Ca is 90.1%).
U—0.044%.

The proportion of uranium retained in the silica was therefore $$\frac{440 \times 508 \times 100}{300 \times 1000} = 74.4\%$$

*Example III*

A slag material was used having a high alumina content as resulting from the thermal treatment of a sample of Middle Congo phosphate having the following analysis:

| | Percent |
|---|---|
| CaO | 48.4 |
| Siliceous matters | 28.88 |
| $Fe_2O_3$ | 0.64 |
| $Al_2O_3$ | 20.39 |
| $P_2O_5$ | 0.23 |

| | |
|---|---|
| $CO_2$ | 0.99 |
| S (sulphide) | 0.36 |
| S (sulphate) | 0.07 |
| Uranium | 0.016 |

As before a pulp was prepared containing 1 kg. ground slag passing completely a 150 mesh screen and 1 kg. water.

Nitric acid was used as the acid reagent. Because of the low $P_2O_5$ content of the slag material, some phosphoric acid was added to the nitric acid, and hence the acidic reagent used comprised

| | Ml. |
|---|---|
| $HNO_3$ containing 834 g./l | 1240 |
| $H_3PO_4$ containing 930 g./l. of $P_2O_5$ | 15 |
| Water to make a total volume of 3000 ml. | |

This introduced a total of 1,034 g. pure $HNO_3$ and 13.95 g. $P_2O_5$ into the reaction mixture, or 3.9% less than the stoichiometrical proportion.

The acid reagent was added in twelve 250 cc. batches, each batch added over a period of 2 minutes and with 2 minute intervals between batches. After addition of the last batch the reaction was allowed to proceed for an extra 15 minutes. The temperature was maintained in the range 69 to 72° C. throughout.

The mass was then filtered. There was obtained 2.7 l. concentrated liquor subsequently used for commercial manufacture of $Ca(NO_3)_2$, and an insoluble filter cake which was washed with four 1.5 liter batches of hot water.

After draining and drying 557 g. of residual silica were obtained, containing CaO—11.1% (solubilization yield of Ca=87.2%) and U—0.020%.

The proportion of retained uranium was $$\frac{557 \times 200 \times 100}{1000 \times 160} = 69.6\%$$

It is noted that the solubilization yield of calcium was lower than that obtained from the less aluminous slag used in Examples I and II, and that the proportion of uranium retained also was somewhat less than with the slag having a higher $P_2O_5$ concentration. It may be noted that the slag used in the third example is in the nature of a boundary case.

As regards the further treatment of the residual solid products obtained in each of Examples I, II and III, to extract the uranium therefrom, this can be done in either of two principal ways.

(a) *By lixiviation with soda carbonate.*—The maximum extraction yield was obtained by using a 7.5% soda carbonate solution, in a proportion of 2 parts per 1 part silica. The extraction yield in 1 hr. at 90° C. was 60%.

(b) *By lixiviation with sulphuric acid.*—Maximum extraction yield in the case of the silica material obtained from Examples I and II was attained by using 260 g. sulphuric acid in the form of a dilute $H_2SO_4$ solution (80 g./l. $H_2SO_4$) per kg. slag treated. In 1 hr. at 85° C. the extraction yield was 80%.

While the sulfuric acid treatment appears more advantageous from the standpoint of the amount of uranium extracted, it is less selective however. This treatment was successfully combined with a treatment involving fixation of the uranyl-sulfuric complexes on a highly basic IR 400 A resin. After elution of the resin, the ammonium diuranate was precipitated in the uranyl nitrate solution.

Extraction with $Na_2CO_3$ without additional purification, yielded a precipitate containing 14% uranium after acidification with $HNO_3$ followed by neutralization with $NH_3$.

What we claim is:

1. A method of recovering uranium from by-product slag resulting from thermal reduction of phosphate ore with carbon in the presence of silica, said ore containing silica, calcium, phosphorus and at least traces of uranium, comprising adding a strong acid reagent, chosen from the group consisting of hydrochloric acid, nitric acid, perchloric acid, phosphoric acid, and mixtures thereof to a pulp or very finely ground slag mixed with water, said reagent containing at least enough phosphoric acid to bring the phosphorus content of the mixture to a value equivalent to 1% $P_2O_5$ based on the weight of the original slag, the total quantity of reagent being not more than the stoichiometric equivalent of the calcium content of the slag and said acid reagent being added to the pulp at a rate sufficiently slow to avoid local excess of acidity in the pulp, and in such a way that the resultant pH value is in the range pH 2 to pH 3, heating the acidified pulp at a temperature from 70° C. to 80° C. for a period of the order of approximately one hour, thereby providing a liquor containing about 90% of the calcium originally in the slag dissolved therein and a residual solid containing more than 70% of the uranium originally present in the slag and separating said residual solid from said liquor.

2. The method claimed in claim 1 and comprising washing the solid product and recovering uranium values therefrom.

References Cited in the file of this patent
UNITED STATES PATENTS 2,813,777     Swensen     Nov. 19, 1957

OTHER REFERENCES

AEC Document MLM–748, September 2, 1952, pp. 4, 6–8.

Marvin et al.: "Proceedings of the International Conference on the Peaceful Uses of Atomic Energy," vol. 8, August 8–20, 1955, pp. 3–7, United Nations, N.Y.C.

UNITED STATES PATENT OFFICE
CERTIFICATE OF CORRECTION

Patent No. 3,044,848                  July 17, 1962

Augustin Driessen et al.

It is hereby certified that error appears in the above numbered patent requiring correction and that the said Letters Patent should read as corrected below.

Column 6, line 25, for "or" read -- of --.

Signed and sealed this 8th day of January 1963.

(SEAL)
Attest:

ERNEST W. SWIDER                  DAVID L. LADD
Attesting Officer                    Commissioner of Patents